Figure 1:
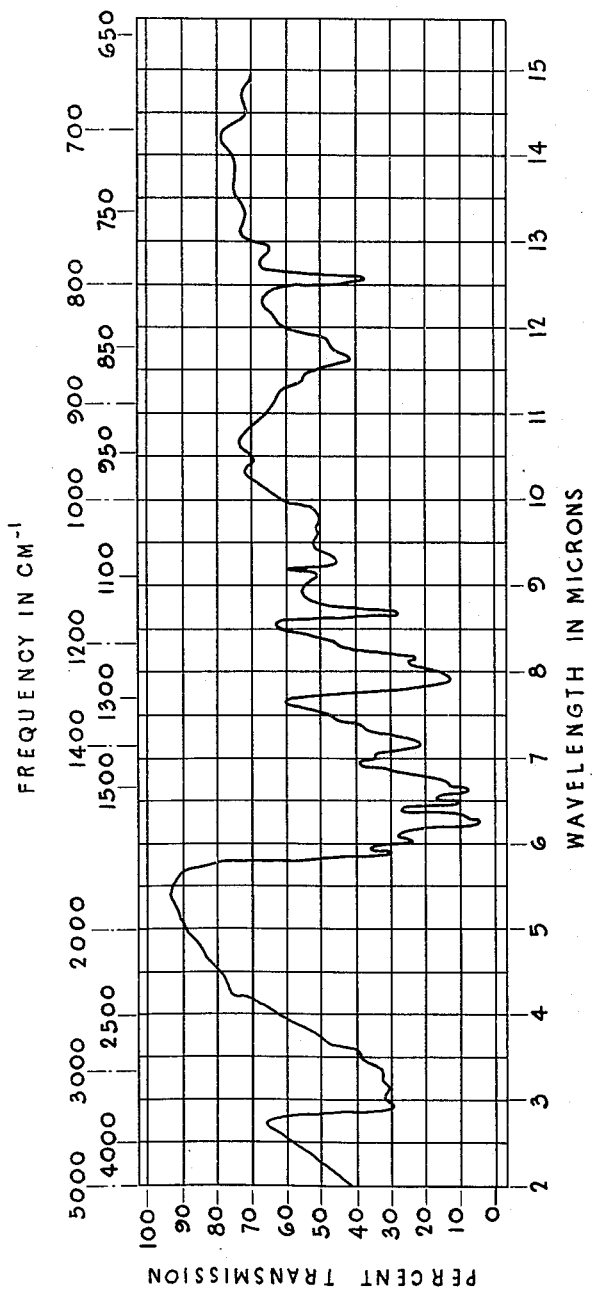

Aug. 15, 1961　　　J. R. D. McCORMICK ET AL　　　2,996,499
COSYNTHETIC FACTOR-1, AND ITS PRODUCTION
Filed June 20, 1958　　　　　　　　　　　　　　　　3 Sheets-Sheet 1

INVENTORS.
JERRY R.D. McCORMICK
NANCY H. ARNOLD
URSULA HIRSCH
PHILLIP A. MILLER
NEWELL O. SJOLANDER
ATTORNEY.

INVENTORS.
JERRY R.D. McCORMICK
NANCY H. ARNOLD
URSULA HIRSCH
PHILLIP A. MILLER
NEWELL O. SJOLANDER

ATTORNEY

United States Patent Office

2,996,499
COSYNTHETIC FACTOR-1, AND ITS PRODUCTION

Jerry Robert Daniel McCormick, New City, Nancy Hazlett Arnold and Ursula Hirsch, Pearl River, and Philip Andrew Miller, New City, N.Y., and Newell Oscar Sjolander, Saddle River, N.J., assignors to American Cyanamid Company, New York, N.Y., a corporation of Maine
Filed June 20, 1958, Ser. No. 743,424
5 Claims. (Cl. 260—236.5)

This invention relates to a novel substance having biological activity which is elaborated by various species of the genus Streptomyces. The novel substance, which we have designated as Cosynthetic Factor-1, hereinafter sometimes referred to as CF-1, has the property of stimulating the production of high concentrations of chlortetracycline when added to a fermentation of strains of S. aureofaciens which produce only minimal amounts of chlortetracycline.

In the copending application of John A. Growich and Philip A. Miller, Serial No. 650,821, filed April 5, 1957, there are described and claimed certain new compounds related to the tetracyclines which have been designated 5a(11a)-dehydrotetracyclines. The 5a(11a)-dehydrotetracyclines are produced by certain strains of S. aureofaciens, such as strain S1308, for example, the morphological and cultural characteristics of which are adequately described in the aforesaid copending application. In addition, viable cultures of S. aureofaciens, strain S1308, as well as several variants thereof have been deposited with the American Type Culture Collection in Washington, D.C. where they have been assigned ATCC Accession Numbers 12748–12751, inclusive. The 5a(11a)-dehydrotetracyclines are largely biologically inactive but they may be converted by a suitable catalytic reduction process to the well-known, broad-spectrum antibiotic tetracycline.

We have now discovered that when the novel substance of this invention is added to a fermentation medium inoculated with S. aureofaciens strain S1308 (ATCC No. 12748), for example, and the culture is grown under standard aerobic conditions, the amount of chlortetracycline produced is increased from about 100–400 micrograms per milliliter to more than 5,000 micrograms per milliliter. In this case, 5a(11a)-dehydrotetracycline is no longer produced. Just why the addition of Cosynthetic Factor-1 to the fermentation produces such a high concentration of chlortetracycline when that fermentation ordinarily produces only minimal amounts of chlortetracycline is not known with certainty, and no theory is advanced with respect thereto. It is known, however, that CF-1 is not a precursor as is shown by the fact that one microgram of CF-1 when added to a sufficient quantity of S. aureofaciens ATCC No. 12748 results in the biosynthesis of up to 57 milligrams of chlortetracycline beyond that normally produced under the same conditions.

The novel substance of this invention is composed of the elements carbon hydrogen, nitrogen and oxygen. Elementary analytical determinations of purified samples indicate elementary proportions by weight substantially as follows: carbon, 50.33%; hydrogen, 5.00%; nitrogen, 12.18%; oxygen (direct), 32.58%. The compound is of relatively low molecular weight, 340–360. The empirical formula based on the analytical values above corresponds closely to $C_{14-15}H_{17}N_3O_7$. The product is soluble in water at pH >6 and is soluble in phenol. It is insoluble in n-butanol, acetone, ether and in water at pH 1–2.

Cosynthetic Factor-1 has an Rf value of 0.07 on a paper chromatogram developed with 1:1 n-butanol-water system and an Rf value of 0.28–0.35 in a 3:1:4 n-butanol-acetic acid-water system, and an Rf value of 0.30–0.40 in pH 10 ammonia-water system. The chromatograms are run at 25° C. using Whatman No. 1 paper and the presence of CF-1 is determined by its characteristic yellow-green fluorescence under ultraviolet light.

In a fifty tube Craig countercurrent distribution operation utilizing 1:1 phenol-chloroform as the organic phase and 0.1 N HCl as the aqueous phase, CF-1 appears as a single component with a peak concentration at tube 31.

An infrared absorption spectrum of a sample of the compound as obtained from dilute hydrochloric acid solution (acid form) is prepared in a standard manner by mixing with potassium bromide crystals and pressing into a disc. The acid form of the compound exhibits characteristic absorption in the infrared region of the spectrum at the following wave lengths expressed in microns: 2.84, 3.18, 3.35, 3.55, 5.91, 6.02, 6.27, 6.35, 6.49, 6.64, 6.72, 7.02, 7.18, 7.35, 7.49, 7.93, 8.16, 8.36, 8.69, 9.15, 9.30, 9.59, 9.77, 9.90, 10.11, 10.47, 11.40, 11.62, 11.81, 12.56, 12.83, 13.30, 14.48. This infrared curve is shown in FIGURE 1 of the accompanying drawings.

Figure 2:
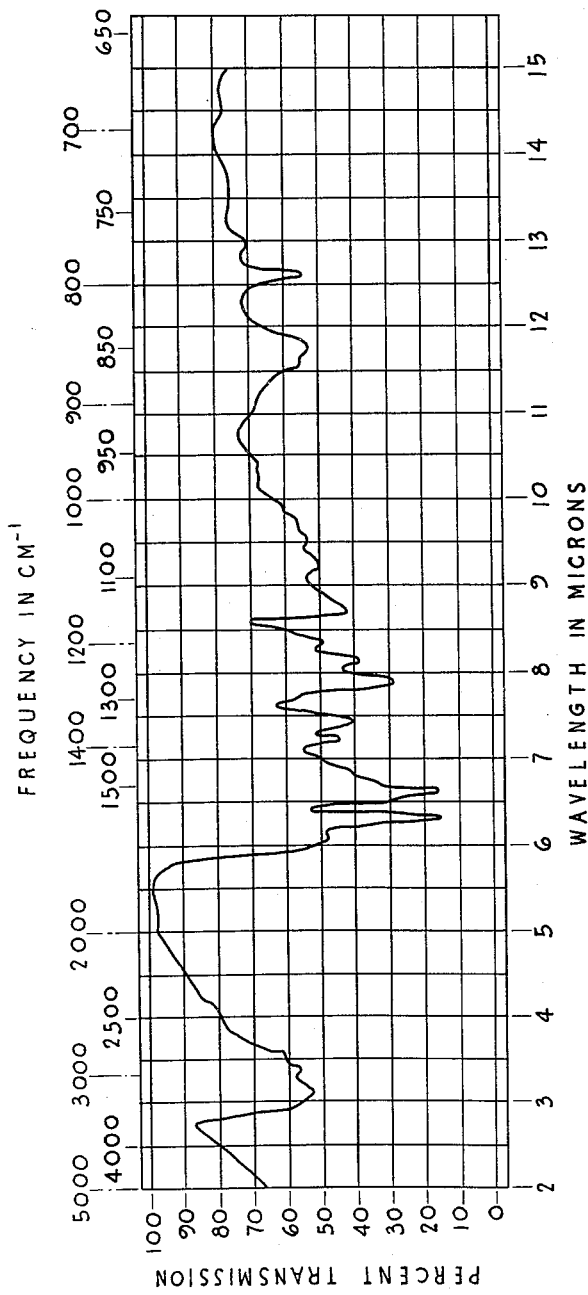

The compound as obtained from pH 7 ammonium hydroxide solution (neutral form) when suspended in a potassium bromide pellet exhibits characteristic absorption in the infrared region of the spectrum at the following wave lengths expressed in microns: 3.12, 3.37, 3.55, 6.07, 6.33, 6.63, 7.00, 7.25, 7.44, 7.88, 8.13, 8.35, 8.73, 9.25, 9.55, 9.63, 9.84, 10.28, 10.42, 11.57, 11.75, 12.60, 12.96, 14.50. This infrared curve is shown in FIGURE 2 of the accompanying drawings.

Figure 3:
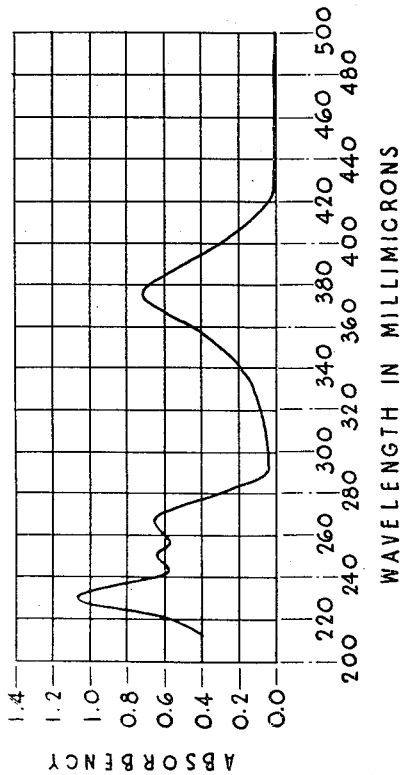

An ultraviolet absorption spectrum determined from a sample of the compound at a concentration of 10.7 micrograms per milliliter in 0.01N HCl, shows characteristic absorption maxima at 230 m$\mu$, 250 m$\mu$, 267 m$\mu$ and 377 m$\mu$, corresponding to extinction coefficient values $$(E_{1\,cm.}^{1\%})$$

of 1010, 580, 600 and 693, respectively. This ultraviolet absorption curve is shown in FIGURE 3 of the accompanying drawings.

Figure 4:
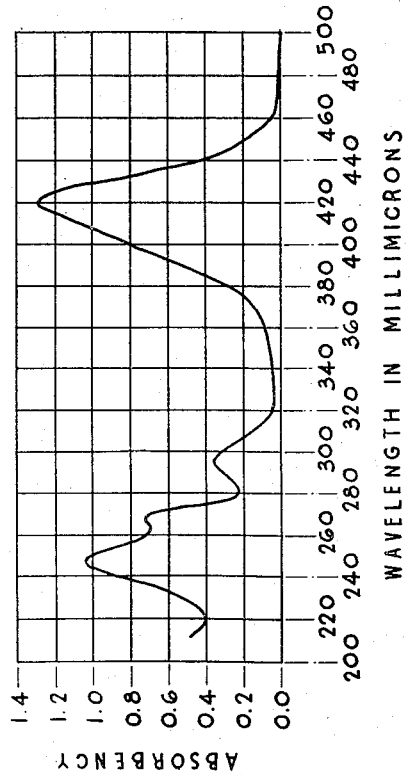

An ultraviolet absorption spectrum determined from a sample of the compound at a concentration of 10.7 micrograms per milliliter in 0.01N NH$_4$OH shows characteristic absorption maxima at 248 m$\mu$, 268 m$\mu$, 295 m$\mu$ and 419 m$\mu$, corresponding to extinction coefficient values $$(E_{1\,cm.}^{1\%})$$

of 972, 684, 349 and 1215, respectively. This curve is shown in FIGURE 4 of the drawings.

As will be apparent from the specific examples appearing hereinafter, the Cosynthetic factor-1 of this invention is produced by a variety of organisms of the genus Streptomyces as evidenced by the enhancement of the production of chlortetracycline when such fermentation mashes are added to a fermentation medium inoculated with a 5a(11a)-dehydrotetracycline-producing culture of S. aureofaciens, such as ATCC strain 12748. These organisms are all species of the genus Streptomyces. Thus, we have successfully used the following species of microorganisms to produce Cosynthetic factor-1: S. albus which produces Vitamine B$_{12}$; S. rimosus, S. platensis and S. hygroscopicus, all of which produce oxytetracycline; S. viridifaciens which produces chlortetracycline and tetracycline; S. aureofaciens which produces chlortetracycline and tetracycline; S. griseus which produces streptomycin; and S. albo-niger which produces puromycin.

The organism that we prefer to use for the production of Cosynthetic factor-1, because of its ability to produce larger amounts of this novel substance is a new strain of S. aureofaciens which we have designated as W-5.

The new strain is a member of the species S. aureofaciens since it is a direct descendant of the chlortetracycline-producing strain of S. aureofaciens A377 which was isolated from the soil and is described in the United States patent to Duggar No. 2,482,055, and the culture is deposited at the Northern Regional Research Laboratories, Peoria, Illinois as NRRL 2209. Mutagenic agents and selective agents used in obtaining this new strain include ultraviolet irradiation, nicotine and nitrogen mustard treatments, and phage exposure. CF-1 may be produced by many strains of Streptomyces and by other microorganisms and by mutants of these strains. The method used for testing new strains for CF-1 production is described in the examples below.

The new strain which is preferred for the production of the new substance of this invention possesses the same general characteristics as do the strains which produce the tetracyclines and differs in the same general manner that the tetracycline-producing and chlortetracycline-producing strains of S. aureofaciens differ from each other, as has been described in a number of scientific papers which have been published. The data appearing below will serve to illustrate the variation of strain W-5 from the original A377 strain available as NRRL 2209.

Streptomyces aureofaciens strain W-5 was differentiated from Streptomyces aureofaciens strain A377 (NRRL 2209) by observation of growth characteristics on various media incubated at 26.5° C.

1. Glycerol asparagine beef extract agar

| | |
|---|---:|
| Glycerol _____percent__ | 1.0 |
| L-asparagine_____do____ | 0.05 |
| Beef extract_____do____ | 0.2 |
| $KH_2PO_4$_____do____ | 0.05 |
| Bacto agar_____do____ | 1.5 |
| Distilled water, q.s._____do____ | 100.0 |
| Adjustment with 50% KOH to pH_____ | 7.0 |
| Post sterilization pH_____ | 7.2 |

| | Streptomyces aureofaciens | |
|---|---|---|
| | Strain W-5 | Strain A377 |
| Growth | Fair to good, hyaline to semi-opaque, white. | Good. |
| Aerial hyphae | Sparse to moderate, white. | Slight to fair, white to light gray. |
| Sporulation | Sparse, dark gray | Light gray. |
| Diffusible pigment | None | Light yellow. |
| Reverse | White, semi-opaque | Yellow to light orange-yellow. |

2. Dextrin Czapek-Dox agar

| | |
|---|---:|
| Dextrin_____percent__ | 1.0 |
| $NaNO_3$_____do____ | 0.2 |
| $K_2HPO_4$_____do____ | 0.1 |
| $MgSO_4.7H_2O$_____do____ | 0.05 |
| KCl_____do____ | 0.05 |
| $FeSO_4.7H_2O$_____do____ | 0.001 |
| Bacto agar_____do____ | 1.5 |
| Distilled water, q.s._____do____ | 100.0 |
| Post sterilization pH_____ | 7.2 |

| | Streptomyces aureofaciens | |
|---|---|---|
| | Strain W-5 | Strain A377 |
| Growth | Very thin, clear hyaline to translucent white. | Good. |
| Aerial hyphae | None | Abundant, mouse gray [1] to lead gray [1] water-white surface globules. |
| Sporulation | do | Profuse. |
| Diffusible pigment | do | Trace, pale yellow. |
| Reverse | Clear hyaline to translucent white. | Apigmentous, pink trace. |

[1] Color Harmony Manual, third edition, Container Corporation of America.

3. AP4 corn steep agar

| | |
|---|---:|
| Corn steep_____percent__ | 0.4 |
| Sucrose_____do____ | 1.0 |
| $MgSO_4.7H_2O$_____do____ | 0.025 |
| $KH_2PO_4$_____do____ | 0.2 |
| $(NH_4)_2HPO_4$_____do____ | 0.2 |
| Bacto agar_____do____ | 2.0 |
| Tap water, q.s._____do____ | 100.0 |
| Post sterilization pH_____ | 6.5 |

| | Streptomyces aureofaciens | |
|---|---|---|
| | Strain W-5 | Strain A377 |
| Growth | Excellent, white | Excellent. |
| Aerial mycelium | Profuse | Abundant, fawn.[1] |
| Sporulation | Profuse, silver gray [1] to beige gray.[1] | Profuse, uniform. |
| Diffusible pigment | None | Light yellow to amber. |
| Reverse | White to beaver [1] to chocolate.[1] | Light tan.[1] |

[1] Color Harmony Manual, third edition, Container Corporation of America.

4. Other media

| Medium | Streptomyces aureofaciens | |
|---|---|---|
| | Strain W-5 | Strain A377 |
| Nutrient Agar | Semi-opaque white growth foci on thin colorless hyaline growth. No aerial mycelium. Reverse: clear hyaline to white. No soluble pigments. | Good growth. No aerial hyphae. Reverse: pale yellow. Pale yellow soluble pigment. |
| Glucose Asparagine Meat Extract Agar. | Fair growth: clear hyaline to translucent white. None to sparse aerial mycelium: white to beaver.[1] Sparse sporulation. Reverse: colorless to white. No soluble pigment. | Good growth. Aerial hyphae white becoming increasingly gray with increase with spore formation. Reverse: light yellow to pink-orange. Trace: yellow-orange soluble pigment. |
| AP6 Corn Steep Agar.[2] | Excellent growth: white. Aerial mycelium: moderate to abundant, silver gray.[1] Moderate to abundant sporulation. Reverse: white to beaver.[1] No soluble pigment. | Excellent growth. Profuse aerial mycelium. Profuse sporulation: fawn.[1] Reverse: tan.[1] Light amber soluble pigment. |
| Waksman's Agar | Good growth; white to light yellow. Aerial mycelium: fair to good, white becoming beaver [1] to ashes.[1] Fair sporulation. Reverse: light yellow [1] to rose taupe [1] to taupe brown.[1] Yellow to amber soluble pigment. | Good growth. Aerial hyphae fair becoming abundant: white to taupe brown.[1] Reverse: camel [1] to adobe brown.[1] Light yellow soluble pigment. |
| Potato Slants | Excellent, smooth, moist nodulated growth: light fawn [1] to copper tan [1] to brick red.[1] No aerial mycelium. Light fawn [1] soluble pigment. | Profuse, moist, smooth, nodulated growth: light brown yellow [1] to beige [1] to cedar.[1] No soluble pigment. |
| Purple Milk | Slight but definite white growth collar, little significant pH change. No apparent peptonization in 14 days. | Slight white to pale yellow growth collar. Little significant pH change nor apparent peptonization in 14 days. |

[1] Color Harmony Manual, third edition, Container Corporation of America.
[2] AP6 Agar:

| | Percent |
|---|---:|
| Sucrose_____ | 1.0 |
| $MgSO_4.7H_2O$_____ | 0.025 |
| $KH_2PO_4$_____ | 0.2 |
| $(NH_2)_3PO_4$_____ | 0.2 |
| Corn Steep_____ | 0.6 |
| Bacto (refined) agar_____ | 2.0 |
| $H_2O$ q.s._____ | 100.0 |

5. Microscopic observations

| Medium | Streptomyces aureofaciens | | | |
|---|---|---|---|---|
| | Strain W-5 | | Strain A377 | |
| | Mycellium | Spores | Mycelium | Spores |
| Glycerol Asparagine Meat Extract Agar. | Flexuous, continuous, branched. Diam. 0.5–1.0μ. | Spheroidal to ovoidal Diam. 0.5–1.0μ. | Flexuous, continuous, branched. Diam. 1.0–1.2μ. | Spheroidal to ovoidal Diam. 1.2–1.5μ. |
| AP4 Cornsteep Agar | Flexuous, continuous, branched. Diam. 0.5–1.0μ. | Spheroidal, to ovoidal Diam. 0.5–1.0μ. | Flexuous, continuous, branched. Diam. 0.8–1.0μ. | Spheroidal to ovoidal Diam. 1.2–1.5μ. |
| Waksman's Agar | Flexuous, continuous, branched. Diam. 0.5–1.0μ. | Spheroidal to ovoidal Diam. 0.5–1.0μ. | Flexuous, continuous, branched. Diam. 0.5–1.0μ. | Spheroidal to ovoidal Diam. 0.5–1.0μ. |

Mycelial and spore morphology of *Streptomyces aureofaciens* strain W-5 is apparently similar to that of the original strain A377.

Viable cultures of *S. aureofaciens* strain W-5 which produce the novel substance of this invention have been deposited with the American Type Culture Collection in Washington, D.C. where this strain has been assigned ATCC Accession Number 13,190.

The conditions for fermentation with the new strain of *S. aureofaciens* of this invention are generally the same as those presently used for cultivating other *S. aureofaciens* strains. That is, the fermentation medium contains the usual nutrients and essential mineral elements. Suitable substances which may provide the necessary nutrients include starch, dextrin, cane sugar, glucose, molasses, soybean meal, peanut meal, yeast, meat extracts, peptone, ammonium sulfate, urea, corn steep liquor, distillers solubles, fish meal and other conventional substances. The inorganic salts that may be used include calcium carbonate, ammonium sulfate, ammonium chloride, and the various trace elements such as manganese, cobalt, zinc, copper, iron and the like.

As distinguished from fermentations of 5a(11a)-dehydrotetracycline producing culture S1308 and its variants which produce small quantities of chlortetracycline, we have not observed any tetracycline or chlortetracycline production when the new *S. aureofaciens* strain W-5 is grown under standard aerobic conditions.

The CF-1 producing culture, such as the new strain described above, is grown aerobically in a suitable inoculum medium. The inoculum is then transferred and grown in a suitable fermentation medium and the fermentation is carried out at a temperature of about 22° C. to 32° C. for from 48 to 168 hours on a rotary shaker. During the fermentation the pH is usually maintained between about 5.5 and 7.5. After the fermentation is complete, the pH of the mash usually ranges from about 6–7. The mash is then filtered without a pH adjustment. The CF-1 may then be extracted, isolated and purified in any suitable manner.

A preferred extraction process involves filtering the mash at the prevailing pH (6–7). The pH of the filtrate is then adjusted to pH 8–9 with ammonium hydroxide and saturated with ammonium sulfate. A suitable carrier such as Arquad 16, which is a long chain alkyltrimethylammonium chloride in which the alkyl groups consist of 90% hexadecyl, 6% octadecyl and 4% octadecenyl, is added and the mixture is then extracted with a lower alkanol, i.e., n-butanol. The n-butanol extract is then adjusted to pH 1.5–2.0 with concentrated hydrochloric acid and is back-extracted with water and the two phases are separated. The aqueous phase which contains the CF-1 is then concentrated under reduced pressure. The aqueous concentrate is then chromatographed on a diatomaceous earth column in the usual manner the column being developed with a buffered solution of n-butanol. The CF-1 rich cuts are then extracted into water and the back-water extract is concentrated under vacuum, the aqueous extract is then chromatographed on a Florisil column. Florisil is an activated magnesium silicate of approximately the following composition:

$$MgO—15.5\% \pm 0.5\%;\ SiO_2—84.0\% \pm 0.5\%$$

and $Na_2SO_4$—0.5%. The CF-1 is eluted from the Florisil column with methyl alcohol containing a small amount of water. The CF-1 rich cuts are concentrated, adjusted to pH 1 with hydrochloric acid and filtered. The filtrate is cooled and seeded. The resulting crystals of CF-1 are collected by filtration, washed and vacuum dried. The crude product may be purified in a standard manner by recrystallization from 0.1 HCl.

The invention will be described in greater detail in conjunction with the following specific examples.

EXAMPLE 1

*Inoculum preparation*

A typical medium used to grow the primary inoculum is prepared according to the following formula:

| | | |
|---|---|---|
| Sucrose | grams | 30.0 |
| Corn steep liquor | milliliters | 16.5 |
| Ammonium sulfite | grams | 2.0 |
| Calcium carbonate | do | 7.0 |

Water to 1000 milliliters.

Eight milliliter aliquots of this medium are placed in each of a series of 8 inch test tubes and sterilized by autoclaving for 20 minutes under 15 pounds per square inch pressure. Spores of strain *S. aureofaciens* W-5 are washed from an agar slant with sterile distilled water to form a suspension containing approximately $60 \times 10^6$ spores per milliliter. A 0.33 milliliter portion of this suspension is used to inoculate each of the tubes containing an 8-milliliter portion of the inoculum medium shown above. The inoculated shaker tube is then incubated for 24 hours at 28° C. on a reciprocating shaker operating at 116 oscillations per minute.

EXAMPLE 2

*Fermentation*

A fermentation medium is prepared according to the following formula:

| | | |
|---|---|---|
| $(NH_4)_2SO_4$ | grams | 5.0 |
| $CaCO_3$ | do | 9.0 |
| $NH_4Cl$ | do | 1.5 |
| $MgCl_2 \cdot 6H_2O$ | do | 2.0 |
| $FeSO_4 \cdot 7H_2O$ | do | 0.06 |

| | |
|---|---|
| $MnSO_4 \cdot 4H_2O$ | grams__ 0.05 |
| $CoCl_2 \cdot 6H_2O$ | do____ 0.005 |
| $ZnSO_4 \cdot 7H_2O$ | do____ 0.1 |
| Corn steep | do____ 25.0 |
| Cottonseed meal | do____ 2.0 |
| Corn starch | do____ 55.0 |
| Water to 1000 milliliters. | |

Twenty-five milliliter portions of the medium are placed in 250 milliliter Erlenmeyer flasks, and 0.5 milliliter of lard oil is added to each flask. The flasks containing the fermentation medium and lard oil are sterilized in an autoclave for 20 minutes under 15 pounds per square inch pressure. Following sterilization and cooling, 1 milliliter of the inoculum, prepared as in Example 1, is added to each flask and the fermentation is carried out at 25° C., for 120 hours, on a rotary shaker operating at 180 revolutions per minute. The mash is assayed and found to contain one microgram per milliliter of Cosynthetic Factor–1.

EXAMPLE 3

Extracted from whole mash

A 200 liter portion of fermentation mash prepared in a pilot tank fermentor with CF–1 producing strain of *S. aureofaciens* W–5 grown in the medium described in Example 2 and assaying one microgram of CF–1 per milliliter is filtered at pH 6–7 using Hyflo Super-Cel (diatomaceous earth) in an amount approximating 15% of mash volume. The filter cake is washed with sufficient water to give a total combined neutral filtrate volume equal to the starting mash volume. The CF–1 potency of the combined neutral filtrate is about one microgram per milliliter. The combined neutral filtrate is concentrated to one-quarter starting mash volume under vacuum at <60° C. Thus the final volume of concentrated combined neutral filtrate is 50 liters.

The combined neutral filtrate concentrate is adjusted to pH 8–9 with concentrated ammonium hydroxide and then saturated with ammonium sulfate. Arquad 16 (cetyltrimethylammonium chloride) is added to this solution in the proportion of 10 milliliters of a 50% Arquad 16 solution in isopropanol to each liter of combined neutral filtrate concentrate, and the mixture stirred for one-half hour. The mixture is then combined with an equal volume of n-butanol and stirred for another one-half hour. The resultant mixture is centrifuged in order to separate the phases. This extraction is repeated using 10 milliliters of 50% Arquad 16 per liter of combined neutral filtrate concentrate and another equal volume of n-butanol. The n-butanol extracts are then combined to yield a final volume of 100 liters. The combined n-butanol extracts are concentrated to one-quarter starting volume under vacuum at <60° C. Thus the final volume of the concentrated combined n-butanol extracts is 25 liters.

The 25 liters of concentrated, combined n-butanol extracts are adjusted to pH 1.5–2.0 with concentrated hydrochloric acid. A 5-liter quantity of water and 200 liters of methylene chloride are added and the mixture stirred well for one-half hour. The 5-liter aqueous layer is separated from the organic phase. The pH of the 5-liter volume of back water extract is adjusted to 7.0 with ammonium hydroxide solution before it is concentrated under vacuum at <60° C. to 5–1.0% of the original fermentation mash volume. One liter of back water extract concentrate is thereby obtained.

Isolation

The one-liter portion of backwater extract concentrate is mixed thoroughly with unbuffered "Celite 545" (diatomaceous silica) on the basis of 2 grams of Celite 545 per milliliter of concentrate. A Celite 545 column is prepared in the following manner: A phosphate buffer solution is made with 10.75 grams of $K_2HPO_4$ per liter of water and adjusted to pH 8.0 with $H_3PO_4$. Celite 545 is mixed thoroughly with pH 8.0 buffer solution in the proportions of 2 grams of Celite 545 per milliliter of buffer solution. A 9-inch diameter column is packed to a height of 2 feet with this buffered Celite 545. The Celite 545 containing the solution of crude Cosynthetic Factor–1 (concentrate of back water extract) is packed on top of the buffered Celite 545 column. The column is developed with n-butanol buffered to pH 8.0 as above. The combined CF–1 rich cuts are mixed with an equal volume of water and two volumes of methylene chloride. The mixture is shaken in a separatory funnel. The organic phase is reextracted with another one-half volume of water. The total volume of combined back water extract amounts to 8 liters which is concentrated under vacuum at <40° C. to 200 milliliters.

Purification

A "Florisil" column is prepared in the following manner: Florisil is packed into a 3-inch diameter column to a height of 18 inches. The column is washed with 0.01N $NH_4OH$ (aqueous) then with methyl alcohol containing 10% water, and finally with 0.01N $NH_4OH$ (aqueous) again. The approximately 200 milliliters of combined back water extract concentrate is placed on top of the packed and washed Florisil column and allowed to pass through; followed by a one liter volume of 0.01N $NH_4OH$ (aqueous) and 500 milliliters of water. Cosynthetic Factor–1 is then eluted from this column by means of methyl alcohol containing 10% water. The combined CF–1 rich cuts are adjusted to pH 7.0 with carbon dioxide, then concentrated at less than 40° C. and under vacuum to yield approximately 100 milliliters of an aqueous solution of CF–1.

The combined CF–1 rich concentrate is adjusted to pH 1.0 with hydrochloric acid, heated to 90° C. and filtered through Whatman No. 4 filter paper. The filtrate is cooled, seeded, and allowed to stand overnight at 15° C. The resulting crystals are collected by filtration, washed first with 0.1 N hydrochloric acid solution, then with water, and finally with acetone, followed by ether, and vacuum-dried at 40° C. overnight to obtain 92 milligrams of crude product.

The crude crystals are dissolved in 0.1N hydrochloric acid solution, heated to 90° C., and cooled in ice-water at about 5° C. to promote crystallization. The newly-formed crystals are first washed with cold (10° C.) 0.1 N hydrochloric acid solution, then with cold water, and dried under vacuum at less than 40° C. for 3 hours to obtain 62 milligrams of the acid form of Cosynthetic Factor–1, melting with decomposition at 280–285° C. The neutral form of the product is obtained by dissolving 5 milligrams of the acid form of CF–1 in 3 milliliters of hot water by the addition of ammonium hydroxide to pH 7.5. The crystalline neutral form precipitates from solution on cooling. The crystals are washed with cold water and then vacuum dried at 40° C. The chemical analysis of CF–1 and its other chemical, physical, and biological properties have already been described.

EXAMPLE 4

A standard CF–1 assay is set up as follows: An inoculum of *S. aureofaciens* S1308 (ATCC 12748) is prepared according to the procedure shown in Example 1. Increments of crystalline CF–1 obtained as described in Example 3 are added to a fermentation medium as shown in Example 2 except that 0.1 microgram per milliliter of riboflavin is added thereto. The medium is then sterilized, inoculated with the 24-hour *S. aureofaciens* S1308 vegetative inoculum, incubated for 120 hours at 25° C., and assayed for the amount of chlortetracycline present.

| CF-1 Added, mcg. ml. | Chlortetracycline Produced (Turbidimetric Assay) mcg. ml. |
|---|---|
| 0 | 360 |
| 0.01 | 925 |
| 0.02 | 1,500 |
| 0.04 | 2,550 |
| 0.08 | 4,270 |
| 0.16 | 5,600 |
| 0.32 | 6,200 |

EXAMPLE 5

A 120-hour fermentation with S. aureofaciens W-5 is carried out following the procedure of Example 2. The resulting mash is filtered without pH adjustment to obtain a W-5 filtrate.

An S. aureofaciens S1308 fermentation is prepared and carried out as in Example 4 but substituting 0.08 milliliter of this W-5 neutral filtrate for the crystalline CF-1 used in Example 4. The harvest mash assays are as follows:

| Milliliters of W-5 Neutral Filtrate per milliliter of S1308 mash | Chlortetracycline Produced (Turbidimetric Assay) |
|---|---|
| 0.00 | 150 |
| 0.08 | 3,410 |

By comparison of these results with those on pure CF-1 in Example 4 it will be seen that the W-5 mash contains 0.85 micrograms of CF-1 per milliliter.

EXAMPLE 6

All of the strains of Streptomyces listed below are grown in separate primary fermentations, and after growth, aliquots of the harvest mashes are added to Erlenmeyer flasks containing the medium shown in Example 2 so that the final total volume of primary fermentation mash plus medium in each flask is 25 milliliters. The flasks and their contents are then sterilized by autoclaving for 20 minutes under 15 pounds per square inch pressure, and subsequently cooled to 25°±5° C.

An inoculum of S. aureofaciens S1308 (ATCC 12748) is prepared according to the technique given in Example 1. At the termination of the 24-hour incubation period, flasks containing the 25 milliliters of combined fermentation mash prepared above are each inoculated with 1.0 milliliter of the S. aureofaciens S1308 inoculum. There inoculated flasks are incubated at 25° C. for 120 hours on a rotary shaker operating at 180 revolutions per minute. At the end of the fermentation period, each flask is assayed fluorometrically for chlortetracycline and the CF-1 content of each primary fermentation mash is calculated with the results obtained being shown below:

| Cultures used in Primary Fermentation | Micrograms of CF-1 per ml. of Primary Fermentation Mash |
|---|---|
| Streptomyces aureofaciens W-5 | 1.37 |
| Streptomyces albus | 0.38 |
| Streptomyces rimosus | 0.05 |
| Streptomyces aureofaciens | 0.023 |
| Streptomyces platensis | 0.37 |
| Streptomyces viridifaciens | 0.35 |
| Streptomyces hygroscopicus | 0.35 |
| Streptomyces griseus | 0.52 |
| Streptomyces albo-niger | 0.07 |

EXAMPLE 7

An S. aureofaciens W-5 neutral filtrate is prepared as described in Example 5. An S. aureofaciens E504 (ATCC 13,191) fermentation is prepared and carried out as in Example 4, but substituting different volumes of the S. aureofaciens W-5 neutral filtrate for the crystalline CF-1 used therein. The harvest mash assays are as follows:

| Milliliters of W-5 Neutral Filtrate per Milliliter of E504 Mash | 7-Chloro-6-demethyltetracycline Produced | |
|---|---|---|
| | Turbidimetric Assay, mcg./ml. | Spectrophotometric Assay, mcg./ml. |
| 0.00 | <0.5 | <50 |
| 0.04 | 105 | 85 |
| 0.12 | 180 | 170 |

The addition of Cosynthetic Factor-1 to the above S. aureofaciens fermentation results in the increased production of 7-chloro-6-demethyltetracycline.

EXAMPLE 8

An S. aureofaciens W-5 neutral filtrate is prepared as described in Example 5. Twenty-five milliliter aliquots of the fermentation medium shown in Example 2 are placed in six 250 milliliter Erlenmeyer flasks. An inhibitor of fermentative chlorination, 2,5-dimercapto-1,3,4-thiadiazole (DMTD), is added to two of the six flasks in the proportion of 0.10 milligrams of DMTD per milliliter of fermentation medium. All six flasks are then sterilized and cooled. An S. aureofaciens S1308 fermentation is prepared and carried out as in Example 4 but substituting 0.08 milliliter of the S. aureofaciens W-5 neutral filtrate for the crystalline CF-1 used therein. The harvest mash assays are as follows:

| Milliliters of W-5 Neutral Filtrate per Milliliter of S1308 Mash | DMTD, mg./ml. | Chlortetracycline Fluorometric Assay, mcg./ml. | Tetracycline Spectrophotometric Assay, mcg./ml. |
|---|---|---|---|
| 0 | 0 | 220 | 0 |
| 0.08 | 0 | 1,420 | 130 |
| 0.08 | 0.10 | 110 | 3,410 |
| 0 | 0 | 280 | 0 |
| 0.08 | 0 | 3,300 | 295 |
| 0.08 | 0.10 | 160 | 3,140 |

The above data show that the addition of Cosynthetic Factor-1 to an S. aureofaciens S1308 fermentation containing a chlorination inhibitor results in the production of tetracycline.

We claim:
1. A cosynthetic factor, said substance being soluble in phenol and in water at pH >6, insoluble in butanol, acetone, ether and water at pH 1-2, said substance containing the elements carbon, hydrogen, nitrogen and oxygen and having an empirical formula corresponding to the following analysis:

Carbon _____ 50.33
Hydrogen _____ 5.00
Nitrogen _____ 12.18
Oxygen _____ 32.42 said substance having a molecular weight of 340–360°, said substance having a melting point of 280–285° C., said substance when dissolved in 0.01N HCl exhibits characteristic ultraviolet absorption maxima at 230 mμ, 250 mμ, 267 mμ and 377 mμ, corresponding to extinction coefficient values $$(E_{1\,cm.}^{1\%})$$

of 1010, 580, 600 and 693, respectively, and when dissolved in 0.01N NH$_4$OH exhibits characteristic ultraviolet absorption maxima at 248 mμ, 268 mμ, 295 mμ and 419 mμ, corresponding to extinction coefficient values $$(E_{1\,cm.}^{1\%})$$

of 972, 684, 349 and 1215, respectively, and when suspended in a potassium bromide pellet the acid form of said substance exhibits characteristic absorption in the infrared region of the spectrum at the following wave lengths expressed in microns: 2.84, 3.18, 3.35, 3.55, 5.91, 6.02, 6.27, 6.35, 6.49, 6.64, 6.72, 7.02, 7.18, 7.35, 7.49, 7.93, 8.16, 8.36, 8.69, 9.15, 9.30, 9.59, 9.77, 9.90, 10.11, 10.47, 11.40, 11.62, 11.81, 12.56, 12.83, 13.30, 14.48, and when suspended in a potassium bromide pellet the neutral form of said substance exhibits characteristic absorption in the infrared region of the spectrum at the following wave lengths expressed in microns: 3.12, 3.37, 3.55, 6.07, 6.33, 6.63, 7.00, 7.25, 7.44, 7.88, 8.13, 8.35, 8.73, 9.25, 9.55, 9.63, 9.84, 10.28, 10.42, 11.57, 11.75, 12.60, 12.96, 14.50.

2. A process for the production of cosynthetic factor-1 which comprises cultivating a cosynthetic factor-1 producing strain selected from the group consisting of Streptomyces aureofaciens, Streptomyces albus, Streptomyces rimosus, Streptomyces platensis, Streptomyces viridifaciens, Streptomyces hygroscopicus, Streptomyces griseus and Streptomyces albo-niger in an aqueous nutrient medium containing assimiable sources of carbohydrate, nitrogen and inorganic salts under submerged aerobic conditions until substantial cosynthetic factor activity is imparted to said medium, and recovering the cosynethic factor so-produced, said cosynthetic factor being the substance as described in claim 1.

3. A process for the production of cosynthetic factor-1 which comprises cultivating Streptomyces aureofaciens ATCC 13,190 in an aqueous nutrient medium containing assimilable sources of carbohydrate, nitrogen and inorganic salts under submerged aerobic conditions until substantial cosynthetic factor activity is imparted to said medium, and recovering the cosynthetic factor so-produced, said cosynthetic factor being the substance as described in claim 1.

4. A process for the production of cosynthetic factor-1 which comprises cultivating a cosynthetic factor-1 producing strain selected from the group consisting of Streptomyces aureofaciens, Streptomyces albus, Streptomyces rimosus, Streptomyces platensis, Streptomyces viridifaciens, Streptomyces hygroscopicus, Streptomyces griseus and Streptomyces albo-niger in an aqueous nutrient medium containing assimilable sources of carbohydrate, nitrogen, and inorganic salts under submerged aerobic conditions for a period of from about 48 to 168 hours and at a temperature of from about 22 to 32° C., and recovering the cosynthetic factor so-produced, said cosynthetic factor being the substance as described in claim 1.

5. A process for the production of cosynthetic factor-1 which comprises cultivating Streptomyces aureofaciens ATCC 13,190 in an aqueous nutrient medium containing assimilable sources of carbohydrate, nitrogen and inorganic salts under submerged aerobic conditions for a period of from about 48 to 168 hours and at a temperature of from about 22 to 32° C., and recovering the cosynthetic factor so-produced, said cosynthetic factor being the substance as described in claim 1.

References Cited in the file of this patent

UNITED STATES PATENTS

| | | |
|---|---|---|
| 2,482,055 | Duggar | Sept. 13, 1949 |
| 2,516,080 | Sobin et al. | July 18, 1950 |
| 2,712,517 | Gourevitch et al. | July 5, 1955 |
| 2,734,018 | Minieri | Feb. 7, 1956 |
| 2,763,591 | Hatch | Sept. 18, 1956 |
| 2,805,185 | Hermann et al. | Sept. 3, 1957 |
| 2,847,471 | Vandeputte | Aug. 12, 1958 |
| 2,878,289 | McCormick et al. | Mar. 17, 1959 |
| 2,923,668 | Goodman | Feb. 2, 1960 |
| 2,931,798 | Umezawa et al. | Apr. 5, 1960 |

FOREIGN PATENTS

| | | |
|---|---|---|
| 713,795 | Great Britain | Aug. 18, 1954 |
| 744,965 | Great Britain | Feb. 15, 1956 |
| 781,843 | Great Britain | Aug. 28, 1957 |

OTHER REFERENCES

The Chemical Age, Dec. 5, 1953, p. 1165, Boothe et al., J.A.C.S., U.S. 75, Sept. 20, 1953, pp. 1621–1623.

Martin et al.: Antibiotics Annual, 1954–1955, pp. 1020–1924.

Sekizawa: Jour. of Biochemistry, vol. 42, No. 2, 1955, pp. 217–219.

Doerschuk et al.: Jour. Am. Chem. Soc., Sept. 5, 1955, p. 4687.

Minieri et al.: Science, vol. 122, p. 1234.

Stevens et al., Jour. Am. Chem. Soc., vol. 78, pp. 1515–1516, Apr. 5, 1956.

Selzer et al., Antibiotics and Chemotherapy, vol. VII, No. 6, pp. 292–296.

Smith et al., Jour. Org. Chem., May 1958, pp. 721–724, vol. 23.

Boothe et al., Jour. Am. Chem. Soc., Apr. 5, 1958, vol. 80, pp. 1654–1657.